United States Patent

[11] 3,618,579

| [72] | Inventor | Robert E. Varran<br>3430 Prospect Road, Ypsilanti, Mich. 48197 |
|---|---|---|
| [21] | Appl. No. | 832,336 |
| [22] | Filed | June 11, 1969 |
| [45] | Patented | Nov. 9, 1971 |

[54] AUXILIARY FUEL DELIVERY SYSTEM
4 Claims, 2 Drawing Figs.

[52] U.S. Cl. ................................................ 123/127, 123/122
[51] Int. Cl. .................................................... F02m31/00, F02m 13/04
[50] Field of Search ........................................... 123/122, 127

[56] References Cited
UNITED STATES PATENTS

| 1,462,844 | 7/1923 | Anderson et al. | 123/122 |
| 1,559,214 | 10/1925 | Woolson | 123/122 |
| 1,887,044 | 11/1932 | Ryan et al. | 123/122 |
| 2,163,241 | 6/1939 | Huber et al. | 123/127 |
| 2,205,750 | 6/1940 | Ross | 123/122 |
| 2,657,913 | 11/1953 | Raymor | 123/127 |
| 2,796,852 | 6/1957 | Schumacher | 123/127 |
| 2,796,855 | 6/1957 | Schumacher | 123/127 |
| 3,198,187 | 8/1965 | Bartholomew | 123/127 |

FOREIGN PATENTS

| 52,193 | 9/1943 | France | 123/122 |
| 965,744 | 9/1950 | France | 123/122 |

Primary Examiner—Mark M. Newman
Assistant Examiner—Ronald B. Cox
Attorney—Hauke, Gifford and Patalidis ABSTRACT: An auxiliary fuel delivery system for an internal combustion engine in which an auxiliary fuel delivery conduit conducts fuel in heat exchange relation with the exhaust manifold of the engine and then through an electrical heating coil where the fuel is heated to the vapor point and is delivered to a valve controlled by a diaphragm device which opens the valve in response to either intake manifold pressures, or through linkage operated from the throttle valve, at high-power engine requirements and thereby injects the heated fuel into the intake manifold downstream of the throttle valve.

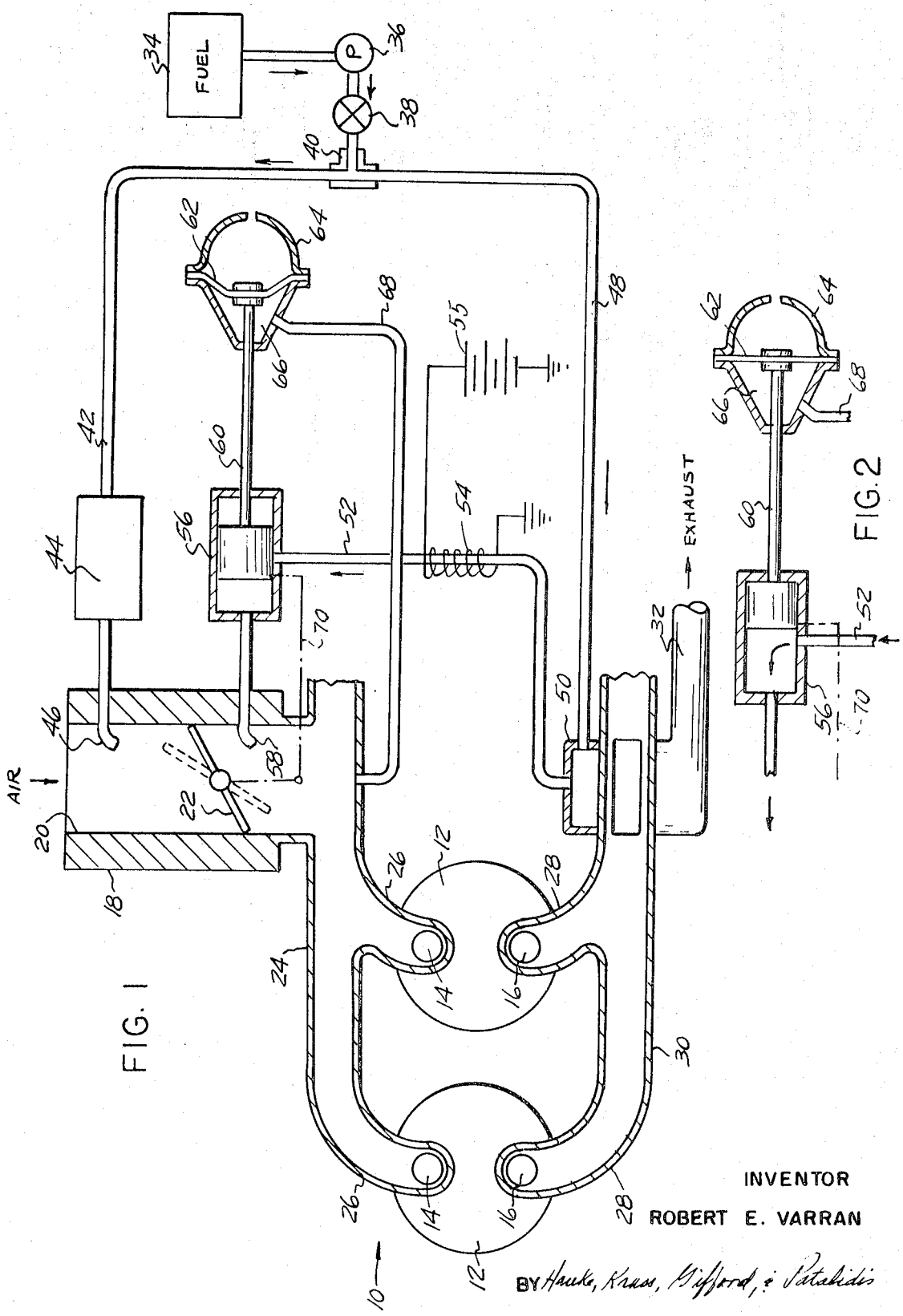

AUXILIARY FUEL DELIVERY SYSTEM

BACKGROUND OF THE INVENTION

1. Field of the Invention

This invention relates to fuel-air mixture charging of internal combustion engines in which an auxiliary fuel system supplies heated fuel into the induction system in response to intake manifold pressure changes or directly with opening of the throttle valve.

2. Description of the Prior Art

Various prior patents illustrate the use of preheated fuel in internal combustion engines. For example, U.S. Pat. No. 2,719,520 discloses an electrically operated fuel vaporizer for use in cold starting of an engine. U.S. Pat. No. 2,851,027 shows a system for introducing electrically heated propane into the intake manifold for cold starting of an engine. U.S. Pat. No. 2,974,656 relates to a fuel preheating device using exhaust manifold heat to preheat all of the primary fuel delivered to the carburetor. U.S. Pat. No. 3,110,296 discloses a preheater and economizer for treating the fuel prior to entering the carburetor using heated water therefore. U.S. Pat. No. 3,160,150 shows a choke-type system which is responsive to both temperature and manifold vacuum for cold starting. U.S. Pat. No. 3,286,703 shows a system in which engine coolant preheats the fuel introduced into the carburetor float bowl.

I am not aware of any system in which an auxiliary supply of fuel diverted from the main fuel supply is preheated to a vapor point and introduced into the intake manifold in response to increases in manifold pressure experienced under certain high-power requirements of the engine or through a control linkage connected with the throttle valve.

SUMMARY OF THE INVENTION

In the present invention, an auxiliary fuel delivery system for an internal combustion engine having an induction system including a carburetor with an air inlet and a throttle valve variably admitting a fuel-air charge to the engine cylinders through an intake manifold, and in which there is a primary fuel system normally delivering fuel to the induction system for mixing with the air, the auxiliary fuel delivery system comprising a dual heating means, preferably an exhaust heater and an electrical heater, for heating a supply of fuel to the vapor point and delivering same independently of the primary fuel system to the induction system, with an intake manifold pressure responsive device or linkage to the throttle valve for selectively controlling a valve for delivering the heated fuel to the induction system at selected operating ranges of the engine.

DESCRIPTION OF THE DRAWINGS

For a more complete understanding of the invention, reference may be had to the accompanying drawing illustrating a preferred embodiment of the invention in which like reference characters refer to like parts throughout the several views and in which:

FIG. 1 is a diagrammatic illustration of an internal combustion engine showing the fuel system embodying the present invention; and FIG. 2 is a fragmentary diagrammatic view of a portion of the auxiliary fuel control in a delivery position.

DESCRIPTION OF THE PREFERRED EMBODIMENTS

As internal combustion engine 10 is illustrated diagrammatically as having engine cylinders 12 with intake ports 14 and exhaust ports 16.

The fuel-air induction system for the engine comprises a carburetor 18 having an air inlet 20 in which is located a throttle valve 22 for variably delivery fuel-air mixture into an intake manifold 24 from which the mixture is delivered to the cylinder intake ports 14 through port runners 26.

Heated combustion products are exhausted from the cylinders 12 through port runners 28 into an exhaust manifold 30 from which they are discharged through an exhaust pipe 32.

The primary fuel system for the engine comprises a fuel tank 34 from which fuel is drawn by a pump 36 and delivered through a check valve 38 and a tee connection 40 or the like through a fuel delivery conduit 42, from whence the fuel is taken by a control device 44 of any preferred type and injected into the carburetor 18 through a fuel port 46. The auxiliary fuel supply system of the invention includes the fuel tank 34, pump 36 and check valve 38 previously mentioned, from which fuel is diverted through the tee 40 into a conduit 48, from which it flows into a heat chamber 50 disposed in heat exchange relation to the exhaust manifold 30 as indicated. Heated fuel is then conducted through a conduit 52 through a heating coil 54 to a valve 56. The heating coil 54 is connected to a suitable electric power source 55 and operates to further heat the fuel in the conduit 52 to at least its vapor point, so that when the valve 56 opens the highly heated fuel vapor will be injected through an auxiliary fuel port 58 into the carburetor 18 intermediate the throttle valve 22 and the intake manifold 24.

The valve 56 is operably connected by any means such as a control rod 60 with a diaphragm 62 mounted in a control device 64 in such a manner as to form a variable volume control chamber 66. The control chamber 66 is openly connected by means of a conduit 68 with the intake manifold 24.

In the position shown in FIG. 1, with the throttle valve 22 in the relatively closed or idle position of the engine, manifold vacuum in the manifold 24 is relatively high, that is the manifold pressure will be relatively low, and this pressure is sensed through the conduit 68 by the control device 64 so as to actuate the diaphragm 62 and its associated control rod 60 to the left as shown to maintain the valve 56 in a closed position. At any time that the demands the engine are increased, such as by an opening of the throttle valve 22 to the phantom line position of FIG. 1, resulting in a loss of manifold vacuum, that is in an increase in manifold pressure to a degree permitting the diaphragm 62 to take the position indicated in FIG. 2, the valve 56 will open to thereupon permit the highly heated fuel from the conduit 52 to be delivered from the outlet 58 into the intake manifold 24.

Alternatively, instead of a manifold pressure controller, a suitable linkage 70 indicated diagrammatically by a phantom line, connects the throttle valve 22 and the valve 56 so that, under high power requirements, as the throttle valve opens to a predetermined position, the valve 56 will open to permit the highly heated fuel from the conduit 52 to be delivered from the outlet 58 into the intake manifold 24.

It will be apparent that many different types of control devices might be incorporated to achieve the desired result, that is the addition of fuel which has a high heat content to the engine for its immediate use therein. Also, various types of valves 56 might be used.

Although I have described and shown only one preferred embodiment of my invention, it will be apparent to one skilled in the art to which the invention pertains that various changes and modifications may be made therein without departing from the spirit of the invention as expressed by the appended claims.

I claim:

1. An auxiliary fuel delivery system for an internal combustion engine having an exhaust system, an induction system including a carburetor with an air inlet and a throttle valve variably admitting a fuel-air charge to the engine cylinders through an intake manifold, and a primary fuel system delivering fuel from a fuel source to said induction system upstream of said throttle valve for mixing with air therein, said auxiliary fuel delivery system comprising means heating a supply of the fuel taken from said same source and delivering same to said induction system downstream of said throttle valve and independently of the delivery of fuel by said primary fuel system and means responsive to high power engine requirements for effecting delivery of said heated fuel upon a predetermined increase in manifold pressure, said fuel heating means heating said fuel to the vapor point prior to delivery to said induction system including a fuel conduit connected with said induction system for delivering said heated fuel to said induction system, said fuel heating means comprising an electric heating element adjacent said fuel conduit capable of heating the fuel in the fuel conduit to the vapor point and a source of electric power connected with said heating element, said heating means further comprising said fuel conduit having a portion in heat exchange relationship with a portion of the exhaust system of said engine, said portion being disposed upstream of said heating element whereby the fuel in said fuel conduit is preheated prior to delivery to said heating element, and said heating element acting in combination with said exhaust heat exchanger to further heat, if necessary, the auxiliary fuel to insure heating to the vapor point temperature.

2. The system as defined in claim 1 wherein said conduit has a valve intermediate said fuel heating means and the connection with said induction system, and control means responsive to manifold pressure for selectively opening and closing said valve.

3. The system as defined in claim 2 wherein said control means comprises a housing having a variable volume chamber, actuator means in said chamber operably connected with said valve, and conduit means connecting said chamber with said induction system intermediate said throttle valve and said engine cylinders to sense manifold pressure variations and alter said chamber volume respectively thereto, said actuator means being operated upon altering of said chamber volume.

4. The system as defined in claim 1 wherein said conduit has a valve intermediate said heat source and the connection with said induction system, and mechanical control means operably connecting said valve with said throttle valve for selectively opening and closing said valve.

* * * * *

UNITED STATES PATENT OFFICE
CERTIFICATE OF CORRECTION

Patent No. 3,618,579            Dated November 9, 1971

Inventor(s) Robert E. Varran

It is certified that error appears in the above-identified patent and that said Letters Patent are hereby corrected as shown below:

Column 4, line 16, delete "heat source" and insert --fuel heating means--.

Signed and sealed this 9th day of May 1972.

(SEAL)
Attest:

EDWARD M. FLETCHER, JR.　　　　　　ROBERT GOTTSCHALK
Attesting Officer　　　　　　　　　　Commissioner of Patents